United States Patent Office 3,751,510
Patented Aug. 7, 1973

3,751,510
DEHYDROGENATION OF OLEFINS
Roger W. Spoerke, Akron, Ohio, assignor to The Goodyear Tire & Rubber Company, Akron, Ohio
No Drawing. Filed Aug. 24, 1970, Ser. No. 66,643
Int. Cl. C07c 5/18
U.S. Cl. 260—680 R  6 Claims

ABSTRACT OF THE DISCLOSURE

There is disclosed a process for the dehydrogenation of olefins to form diolefins by subjecting olefins to dehydrogenation conditions. Alkali metals and alkaline earth metals in an unoxidized state on suitable supports such as carbon, alumina, silica, etc. are used as catalysts.

---

The present invention relates to a process for effecting the dehydrogenation of olefins to produce diolefins. More particularly, the invention is directed to a catalytic process for the dehydrogenation of olefins to form diolefins in, not only higher yields, but higher selectivities to the corresponding diolefins. More particularly, the invention is directed to a process utilizing alkali metals and alkaline earth metals, on suitable supports as catalysts for the dehydrogenation of olefins to form diolefins.

Various methods are known for the dehydrogenation of olefins to form diolefins. However, the majority of the dehydrogenation processes presently used or available are inefficient in that very low conversions per pass are obtained and much recycling of the unreacted olefin must be done. These low efficiencies and large recycling requirements dictate excessive capitalization to implement such processes. Furthermore, many of the processes available are subjected to excessive carbonization of the catalysts and to prevent excessive carbonization, large amounts of a diluent, such as steam, are required, again dictating a large capital outlay as well as excessive operating cost. To overcome certain of the deficiencies, some of the prior art processes are operated at high temperatures. However, often high temperatures lead to excessive cracking or decomposition of the reactants, resulting in lower efficiencies. Other prior art processes often result in other types of chemical conversion such as isomerization and, for this reason, lead to decreased efficiency.

It is the object of this invention to provide a process to dehydrogenate olefins to form diolefins which does not require the use of large amounts of diluent, such as steam. Another object is to provide an olefin dehydrogenation process with low operating cost. Still another object is to provide a dehydrogenation process with moderate capitalization requirements. Still another object is to provide a process where higher yields of diolefin are possible which translates into smaller reactor size and less recycling of the unreacted reactant. Still another object is to provide a process which will provide higher conversion selectivities to the desired diolefin, thus, requiring a simpler purification system. Other objects will become apparent as the description proceeds.

It is known that butadiene can be produced by the dehydrogenation of 1-butene or 2-butene; isoprene can be produced by the dehydrogenation of isoamylenes or methyl butenes; that piperylene can be produced from normal pentenes; that 2,3-dimethyl-1,3-butadiene can be produced by the dehydrogenation of 2,3-dimethyl butenes; that 2- and 4-methyl-1,3-pentadiene can be produced by dehydrogenating 2-methyl-2-pentene; that 3-methyl-1,3-pentadiene can be produced by dehydrogenating 3-methyl-1- and 2-pentenes; that 2-ethyl-1,3-butadiene can be produced by the dehydrogenation of 2-ethyl-1-butene; that styrene can be produced by the dehydrogenation of ethyl benzene and alpha methyl styrene can be produced by the dehydrogenation of isopropyl benzene.

It has now been discovered that alkali metal and alkaline earth metals, when deposited in metal form, i.e. unoxidized, on suitable supports, provide excellent catalysts for the conversion of these olefins into the corresponding diolefins.

The catalyst useful in the dehydrogenation of olefins into diolefins in accordance with this invention are at least one metal from the group, such as sodium, lithium, potassium, cesium, magnesium, calcium, strontium and barium. Mixtures of these metals may also be employed.

Since the catalyst of this invention is an alkali or an alkaline earth metal, they should be supported on a suitable support. Representative of the suitable supports useful for this purpose are activated carbon, graphite, alumina, silica, silica aluminas, magnesia, metal carbonates, titanias, zirconias, chromias and the like. The supports may be modified by using materials such as $K_2O$ or $Na_2O$ to reduce surface acidities and, of course, cracking activity.

The amount of metal which should be deposited on the support may vary from about 0.5 percent up to about 100 percent; however, a more preferable amount varies from about 0.5 percent to about 30 percent. These percentages are based on the weight of the support.

The residence time employed in this invention may vary from 0.01 second to several minutes with a time of 0.1 second to 2 minutes being preferred and a time of 0.3 second to 1 minute being more preferred. The temperatures may vary from about 350° C. to about 800° C. with about 400° C. to about 700° C. being more preferred. It should be understood that the residence time and the temperatures are somewhat dependent on the nature of the olefin to be dehydrogenated and the particular metal catalyst employed. Also, it should be understood that the residence time and temperature are somewhat interdependent on each other. Usually the lower the temperature, the longer the residence time required and vice versa.

While it is not necessary to use a diluent, an inert diluent may be employed so long as the inert diluent does not contain any oxygen which may convert the supported metal catalyst into a metal oxide. Suitable diluents for this purpose would be the inert gases, nitrogen, saturated hydrocarbons, such as methane, ethane, propane and the like. As has been indicated, the dehydrogenation process of this invention does not require a diluent. However, if a diluent is employed, it may be employed in very low amounts up to a diluent to olefin ratio of 30:1.

The invention is further illustrated by reference to the following examples which are intended to be illustrative and not limiting of the invention.

EXAMPLE I

This example illustrates one method of preparing the catalyst of this invention. A weighed amount of alumina 6–8 mesh was heated at 450° C. under a vacuum for 12 hours to insure its dryness. A dry inert gas, in this case helium, was bled into the system to regain atmospheric conditions. The temperature was lowered to 375° C. and a pre-weighed amount of sodium metal, to give 10 percent sodium on the alumina, was added to the alumina with manual stirring. A flow of helium gas was kept over the catalyst throughout its preparation to insure that the sodium remained unoxidized.

EXAMPLE II

A dehydrogenation experiment was conducted in a tubular stainless-steel reactor, having an internal capacity of two cubic centimeters, equipped with a block electrical heater and a Cromel-Alumel thermocouple. The catalyst was placed in this reactor and 2-pentene was dehydrogenated utilizing helium as a diluent. When the proper conditions of residence time and temperature had been realized, the effluent product was sent directly to a gas chromatograph for analysis. The results of these experiments are set forth in the table below. In experiment No. 2, no sodium was employed and only alumina was used as the catalyst. In a comparison of Run 2 versus 3, it will be apparent that a rather striking improvement in selectivity was obtained when metallic sodium was employed as the catalyst.

TABLE 2

| Run No. | Catalyst | Temp., °C. | Diolefin selectivity | Mole percent |
|---|---|---|---|---|
| 1 | 10% Na on alumina | 550 | Piperylene | 87.5 |
| 2 | Alumina | 600 | do | 45.0 |
| 3 | 10% Na on alumina | 600 | do | 77.0 |

EXAMPLE III

Dehydrogenation experiments were conducted in the same reactor as that employed in Example II, except that 2-methyl-2-butene was dehydrogenated to form isoprene; 2-methyl-1-butene was dehydrogenated to form isoprene and in Run No. 3, 2,3-dimethyl-2-butene was dehydrogenated to form dimethyl butadiene. The catalyst employed in all cases was 10% sodium on alumina.

TABLE 3

| Run No. | Reactant | Temp., °C. | Diolefin selectivity | Mole percent |
|---|---|---|---|---|
| 1 | 2-Me-2-butene | 600 | Isoprene | 70.0 |
| 2 | 2-Me-1-butene | 600 | do | 73.0 |
| 3 | 2,3-D Me-2-butene | 600 | Dimethyl butadiene | 79.5 |

EXAMPLE IV

In these experiments, 2-pentene was dehydrogenated in a reactor similar to that employed in Example II. The catalyst employed was 10 percent sodium supported on alumina.

TABLE 4

| Run No. | Reactant | Temp., °C. | Diolefin selectivity | Mole percent |
|---|---|---|---|---|
| 1 | Pentene-2 | 450 | Piperylene | 96.0 |
| 2 | do | 400 | do | 99.0 |

In order to indicate that the catalyst involved in these experiments was in metallic form, the following experiments were conducted. A catalyst comprising 10 weight percent sodium on alumina, as prepared in accordance with Example I, was treated at 575° C. with air and water vapor (steam), in an attempt to convert the sodium into an oxide of sodium ($Na_2O$). After sufficient treatment to form the oxide of sodium, 2-pentene was passed over this catalyst at 575° C. This experiment resulted in only a 51 percent selectivity to piperylene.

In another experiment, a catalyst consisting of 10 percent $NaNO_2$ on alumina was decomposed by heating in air at 500° C. to convert the $NaNO_2$ to $Na_2O$, 2-pentene was passed over this catalyst at 550° C. and resulted in a selectivity to piperylenes of only 29 percent. When the temperature was raised to 600° C. the selectivity fell to 16 percent.

While certain representative embodiments and details have been shown for the purpose of illustrating the invention, it will be apparent to those skilled in this art that various changes and modifications may be made therein without departing from the spirit or scope of the invention.

What is claimed is:

1. A method for the dehydrogenation of olefins to produce diolefins which comprises subjecting the olefin to a catalyst consisting of at least one metal selected from the group consisting of sodium, lithium, potassium, cesium, magnesium, calcium and beryllium, said metal being supported on a suitable porous support in amounts varying from about 0.5 to about 100 percent based on the weight of the support, at temperatures varying from about 350° C. to about 800° C. and residence times varying from about 0.05 second to about 5 minutes.

2. A method according to claim 1 in which the olefin to be dehydrogenated is pentene-2 and the diolefin produced is piperylene.

3. A method according to claim 1 in which the olefin to be dehydrogenated is 2,3-dimethyl-2-butene and the diolefin produced is 2,3-dimethyl-butadiene.

4. A method according to claim 1 in which the olefin to be dehydrogenated is at least one olefin from the group of 2-methyl-2-butene and 2-methyl-1-butene and the diolefin produced is isoprene.

5. A method according to claim 1 in which the olefin to be dehydrogenated is at least one olefin from the group of 2-butene and 1-butene and the diolefin produced is 1,3-butadiene.

6. A method according to claim 1 in which the process is conducted in the presence of an inert diluent.

References Cited

UNITED STATES PATENTS 3,207,805  9/1965  Gay _____ 260—680

PAUL M. COUGHLAN, Jr., Primary Examiner

U.S. Cl. X.R.

260—669 R